(12) United States Patent
Yoshino

(10) Patent No.: US 9,425,449 B2
(45) Date of Patent: Aug. 23, 2016

(54) OUTER PACKAGING MATERIAL FOR BATTERY, AND BATTERY

(71) Applicant: Showa Denko Packaging Co., Ltd., Isehara-shi, Kanagawa (JP)

(72) Inventor: Kenji Yoshino, Hikone (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 133 days.

(21) Appl. No.: 14/050,504

(22) Filed: Oct. 10, 2013

(65) Prior Publication Data
US 2014/0141299 A1 May 22, 2014

(30) Foreign Application Priority Data

Nov. 1, 2012 (JP) .................................. 2012-241723
Nov. 21, 2012 (JP) .................................. 2012-255046

(51) Int. Cl.
*H01M 2/02* (2006.01)
*H01M 2/12* (2006.01)

(52) U.S. Cl.
CPC ............. *H01M 2/1241* (2013.01); *H01M 2/02* (2013.01); *H01M 2/0217* (2013.01); *H01M 2/0287* (2013.01); *H01M 2/026* (2013.01); *H01M 2/0262* (2013.01); *H01M 2/0267* (2013.01)

(58) Field of Classification Search
CPC .............................. H01M 2/0217; H01M 2/02
See application file for complete search history.

(56) References Cited

U.S. PATENT DOCUMENTS

2008/0286635 A1* 11/2008 Seino et al. .................... 429/94
2013/0029140 A1* 1/2013 Takao ...................... H01G 9/08
428/336
2014/0134475 A1* 5/2014 Kuramoto et al. ............ 429/176

FOREIGN PATENT DOCUMENTS

| JP | 2007-265725 A | 10/2007 |
| WO | WO2011132545 | * 10/2011 |
| WO | WO2012133683 | * 10/2012 |

* cited by examiner

*Primary Examiner* — Stewart Fraser
*Assistant Examiner* — Olatunji Godo
(74) *Attorney, Agent, or Firm* — Keating and Bennett, LLP

(57) ABSTRACT

An outer packaging material for a battery includes a heat resistant stretched resin film layer as an outer layer integrally laminated on one of surfaces of an aluminum foil layer via a first adhesive layer. A thermoplastic unstretched resin film layer as an inner layer is integrally laminated on the other surface of the aluminum foil layer via a second adhesive layer. An adhesive strength between the inner layer and the aluminum foil layer is 4N/15 mm-width to 30N/15 mm-width, and an adhesive strength between the outer layer and the aluminum foil layer is 2N/15 mm-width to 14N/15 mm-width. As a thermoplastic unstretched resin film constituting the inner layer, a thermoplastic unstretched resin film having a sealing strength of two sheets of the thermoplastic unstretched resin films arranged one on the other and heat sealed exceeding 30N/15 mm-width but not exceeding 110N/15 mm-width is used.

6 Claims, 5 Drawing Sheets

OUTER PACKAGING MATERIAL FOR BATTERY, AND BATTERY

TECHNICAL FIELD

The present invention relates to an outer packaging material for a battery, such as a lithium-ion secondary battery, etc. In this specification and claims, the wording of "aluminum" is used to include the meaning of aluminum and its alloys.

TECHNICAL BACKGROUND

A lithium-ion secondary battery is widely used as a power source for, for example, notebook computers, video cameras, mobile phones, electric cars, etc. As such a lithium-ion secondary battery, a lithium-ion secondary battery having a structure in which a battery main body portion (a main body portion including a positive electrode, a negative electrode, and electrolyte) is surrounded by a case is used. As the casing material (outer packaging material), a packaging material having a structure is publically known in which, for example, an outer layer made of a heat resistant resin film, an aluminum foil layer, and an inner layer made of a thermoplastic resin film are integrally bonded in this order.

In the meantime, in a lithium-ion secondary battery, etc., a gas is easily generated in the battery main body at the time of overcharging and/or overheating, which sometimes causes a case in which a gas is gradually accumulated in the inner space covered by the outer packaging material to thereby increase the internal pressure of the outer packaging material. If this internal pressure increase becomes large, there is a concern that the outer packaging material ruptures to cause scattering of the contained material in the inner portion of the outer packaging material. Therefore, there has been proposed a technology to prevent rupturing of the outer packaging material.

For example, Patent Document 1 describes that, at a portion of a peripheral edge portion of an outer packaging member of a lithium-ion secondary battery, a safety valve for releasing a gas generated in the outer packaging to the outside of the outer packaging is provided.

Patent Document 1: Japanese Unexamined Patent Application Publication No. 2007-265725

DISCLOSURE OF THE INVENTION

Problems to be Solved by the Invention

However, in the case of providing a safety valve for releasing the gas generated in the outer packaging to the outside thereof, there were problems that an additional step for providing such a safety valve was needed, resulting in complex production processes and deteriorated productivity.

The present invention was made in view of the aforementioned technical background, and aims to provide an outer packaging material for a battery and a battery excellent in productivity and capable of obtaining sufficient sealing characteristics and preventing rupturing of the outer packaging material due to an internal pressure increase by degassing when the internal pressure of the battery case constituted by the outer packaging material is increased.

Means to Solve the Problems

To achieve the aforementioned objects, the present invention provides the following means.

[1] An outer packaging material for a battery, comprising:
an aluminum foil layer;
a heat resistant stretched resin film layer as an outer layer integrally laminated on one surface of the aluminum foil layer via a first adhesive layer; and
a thermoplastic unstretched resin film layer as an inner layer integrally laminated on the other surface of the aluminum foil layer via a second adhesive layer,
wherein an adhesive strength between the inner layer and the aluminum foil layer is 4N/15 mm-width to 30N/15 mm-width,
wherein an adhesive strength between the outer layer and the aluminum foil layer is 2N/15 mm-width to 14N/15 mm-width, and
wherein, as a thermoplastic unstretched resin film constituting the inner layer, a thermoplastic unstretched resin film having a sealing strength of two sheets of the thermoplastic unstretched resin films arranged one on the other and heat sealed exceeding 30N/15 mm-width but not exceeding 110N/15 mm-width is used.

[2] The outer packaging material for a battery as recited in the aforementioned Item 1, wherein the second adhesive layer is a layer formed by a dry lamination method using an adhesive agent.

[3] A battery comprising:
two sheets of the outer packaging materials as recited in the aforementioned Item 1 or 2; and
a battery main body portion,
wherein the battery main body portion is arranged between the two sheets of the outer packaging materials,
wherein peripheral edge portions of the inner layers of the two sheets of the battery packaging materials are seal-bonded by heat sealing to form a battery case, and
wherein the battery main body portion is encapsulated in the battery case.

[4] The battery as recited in the aforementioned Item 3, wherein, when an internal pressure of the battery case is increased to a range of 40 kPa to 80 kPa due to a gas generated in the battery case, a penetrated exhaust passage communicated with an inner space of the battery case is formed in the inner layer, and a separation gap communicated with the penetrated exhaust passage is formed between the aluminum foil layer and the inner layer, so that a gas in the battery case is released to the outside via the penetrated exhaust passage and the separation gap to prevent rupturing of the battery case due to an internal pressure increase.

[5] The battery as recited in the aforementioned Items 3 or 4, wherein at least one of the two sheets of the outer packaging materials is formed into a three-dimensional shape by deep draw processing or bulge processing.

[6] The battery as recited in the aforementioned Item 5, wherein the penetrated exhaust passage is formed at a curved or bent shaped corner portion of the inner layer formed by the processing or vicinity thereof.

Effect of the Invention

In the invention [1] (battery outer packaging material), as the thermoplastic unstretched resin film constituting the inner layer, since a thermoplastic unstretched resin film having a sealing strength of two sheets of the thermoplastic unstretched resin films arranged one on the other and heat sealed exceeding 30N/15 mm-width but not exceeding 110N/15 mm-width is used, sufficient airtightness inside the outer packaging material after heat sealing can be obtained. Also, since the adhesive strength between the outer layer and the aluminum foil layer is 2N/15 mm-width to 14N/15 mm-width, the effects of sufficiently protecting the aluminum foil layer and improving the formability can be exerted. Further, the adhesive strength between the inner layer and the aluminum foil layer is 4N/15 mm-width to 30N/15 mm-width, which is smaller than the sealing strength of the inner layers arranged one on the other and heat sealed with each other, when the internal pressure of the battery case constituted by the outer packaging material increases due to generation of a gas in the battery main body portion, a separation gap is most likely to be formed between the inner layer and the aluminum foil layer. Therefore, when the internal pressure of the battery case constituted by the outer packaging material is increased, a separation gap is generated between the inner layer and the aluminum foil layer, thereby contributing to releasing of a gas in the battery case and preventing rupture of the outer packaging material due to an internal pressure increase of the battery case constituted by the outer packaging material.

In the invention [2] (battery outer packaging material), since the second adhesive layer is formed by a dry lamination method using an adhesive agent, adjustments of the adhesive strength can be easily made by changing the adhesive agent depending on the intended use.

In the inventions [3] and [4] (Battery), a battery case is formed by seal-bonding the peripheral edge portions of the inner layers of the two outer packaging materials by heat sealing with the battery main body portion arranged therebetween, and the battery main body portion is encapsulated in the battery case. When the internal pressure of the battery case is increased to a range of 40 kPa to 80 kPa due to a gas generated in the battery case, a penetrated exhaust passage communicated with the inner space of the battery case is formed in the inner layer, and a separation gap communicated with the penetrated exhaust passage is formed between the aluminum foil layer and the inner layer, thereby releasing the gas in the battery case via the penetrated exhaust passage and the separation gap. This in turn can prevent rupturing of the battery case due to an internal pressure increase of the battery case.

In the invention [5] (Battery), at least one of the two sheets of the outer packaging materials is formed into a three-dimensional shape by deep draw processing or bulge processing, and when the internal pressure of the battery case is increased to a range of 40 kPa to 80 kPa, a penetrated exhaust passage is more likely to be formed at a curved or bent shaped corner portion formed by the aforementioned processing or vicinity thereof, which can sufficiently prevent rupturing of the battery case due to an internal pressure increase of the battery case.

In the invention [6] (battery), since the penetrated exhaust passage is formed at a curved or bent shaped corner portion of the inner layer formed by the aforementioned processing or vicinity thereof, when the internal pressure of the battery case is increased to a range of 40 kPa to 80 kPa, a penetrated exhaust passage is even more likely to be formed, which further sufficiently prevents rupturing of the battery case due to an internal pressure increase of the battery case.

PREFERRED EMBODIMENTS FOR CARRYING OUT THE INVENTION

Figure 1:
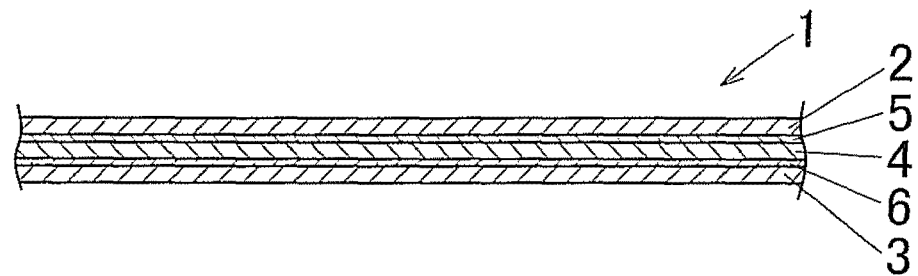
FIG. 1 is a cross-sectional view showing an embodiment of an outer packaging material for a battery according to the present invention.

An embodiment of an outer packaging material 1 for a battery according to the present invention is shown in FIG. 1. This battery outer packaging material 1 is used as an outer packaging material for a lithium-ion secondary battery. The battery outer packaging material 1 is structured such that a heat resistant stretched resin film layer (outer layer) 2 is integrally laminated on an upper surface of an aluminum foil layer 4 via a first adhesive layer 5 and a thermoplastic unstretched resin film layer (inner layer) 3 is integrally laminated on a lower surface of the aluminum foil layer 4 via a second adhesive layer 6.

In the present invention, the adhesive strength between the inner layer 3 and the aluminum foil layer 4 is set to 4N/15 mm-width to 30N/15 mm-width, and the adhesive strength between the outer layer 2 and the aluminum foil layer 4 is set to 2N/15 mm-width to 14N/15 mm-width.

Further, as a thermoplastic unstretched resin film constituting the inner layer 3, a thermoplastic unstretched resin film is used in which a sealing strength of two sheets of the films arranged one on the other and heat sealed falls within a range exceeding 30N/15 mm-width but not exceeding 110N/15 mm-width.

In the present invention, since there is a relation that the adhesive strength between the inner layer 3 and the aluminum foil layer 4 is smaller than the sealing strength between the inner layers 3, when the internal pressure of the gas inside the battery case 11 constituted by the outer packaging material 1 in the battery 10 is increased, a separation gap 22 is most likely generated between the inner layer 3 and the aluminum foil layer 4. Therefore, when the internal pressure of the gas inside the battery case 11 constituted by the packaging material 1 is increased, a separation gap 22 is formed between the inner layer 3 and the aluminum foil layer 4. This contributes to releasing of the gas in the battery case 11 to the outside, which in turn can prevent rupturing (bursting) of the packaging material 1 due to the internal pressure increase of the inner portion of the battery case 11 (outer packaging material 1). It is assumed that possible outflow of the electrolyte can be prevented by closing the separation gap 22 with the second adhesive agent 6 immediately after releasing of the gas.

If the adhesive strength between the inner layer 3 and the aluminum foil layer 4 is less than 4N/15 mm-width, the adhesive strength is not sufficient, causing a problem that the inner layer causes separation when the packaging material is subjected to processing such as deep draw processing, etc. On the other hand, if the adhesive strength is more than 30N/15 mm-width, a gas cannot be released in a low pressure state (around 40 kPa to 80 kPa) when the internal pressure is increased, and when the pressure reaches a high pressure higher than 80 kPa, there arises a problem that the electrolyte flows outside. Among other things, it is preferable that the adhesive strength between the inner layer 3 and the aluminum foil layer 4 is set to 5N/15 mm-width to 29N/15 mm-width.

If the adhesive strength between the outer layer 2 and the aluminum foil layer 4 is less than 2N/15 mm-width, the adhesive strength is insufficient, causing a problem that the outer layer separates when the packaging material is subjected to forming processing such as deep draw processing, etc. There is no special problem even if the adhesive strength between the outer layer 2 and the aluminum foil layer 4 becomes larger than 14N/15 mm-width. However, if it exceeds 14N/15 mm-width, breakage of the film of the outer layer occurs at the time of measuring the adhesive strength, which actually prevents measurements. For this reason, the upper limit of the adhesive strength is set to 14N/15 mm-width. Among other things, it is preferable that the adhesive strength between the outer layer 2 and the aluminum foil layer 4 is set to 4N/15 mm-width to 12N/15 mm-width.

As the thermoplastic unstretched resin film constituting the inner layer 3, when a thermoplastic unstretched resin film is used in which a sealing strength of two sheets of the films arranged one on the other and heat sealed is 30N/15 mm-width or lower is used, the heat sealing strength is insufficient, causing a risk of leakage of the contained materials. When the sealing strength exceeds 110N/15 mm-width, a gas cannot be released even if the internal pressure is increased, causing a problem that rupturing (bursting) of the packaging material 1 cannot be prevented. Among other things, as a thermoplastic unstretched resin film constituting the inner layer 3, it is preferable to use a thermoplastic unstretched resin film having a sealing strength of two sheets of the films arranged one on the other and heat sealed falling within a range of 35N/15 mm-width to 110N/15 mm-width.

The heat resistant stretched resin film layer (outer layer) 2 is a member that mainly undertakes a role of maintaining excellent formability as an outer packaging material. In other words, it undertakes a role of preventing breakage of the aluminum foil layer due to necking during the forming processing.

The heat resistant stretched resin film layer (outer layer) 2 is not specifically limited, but it is preferable to use, for example, a stretched nylon film or a stretched polyester film. Among them, it is especially preferable that the heat resistant stretched resin film layer is constituted by a biaxially stretched nylon film, a biaxially stretched polybutylene terephthalate (PBT) film, a biaxially stretched polyethylene terephthalate (PET) film, or a biaxially stretched polyethylene naphthalate (PEN) film.

The thickness of the heat resistant stretched resin film layer 2 is preferably set to 12 µm to 50 µm.

The thermoplastic unstretched resin film layer (inner layer) 3 undertakes a role of giving an excellent chemical resistance against, for example, electrolytes strong in corrosiveness used for a lithium-ion secondary battery, etc., and also undertakes a role of giving a heat-sealing characteristic to the outer packaging material.

The thermoplastic unstretched resin film layer 3 is preferably constituted by, although not specifically limited to, an unstretched film made of at least one type of thermoplastic resins selected from the group consisting of polyethylene, polypropylene, olefin-series copolymer, acid denaturation and ionomer thereof.

The thickness of the thermoplastic unstretched resin layer 3 is preferably set to 20 to 80 µm. Setting the thickness to 20 µm or more sufficiently prevents generation of pinholes. Setting the thickness to 80 µm or less reduces the amount of resin to be used, enabling cost reduction. Among other things, it is especially preferable that the thickness of the thermoplastic unstretched resin layer 3 is set to 30 to 50 µm.

The aforementioned heat resistant stretched resin film layer 2 and the thermoplastic unstretched resin film layer 3 each can be a single layer or a multi-layer.

The aluminum foil layer 4 undertakes a role of giving a gas barrier performance which prevents invasion of oxygen and/or moisture into the outer packaging material. As the aluminum foil 4, a foil made of pure aluminum or Al—Fe series alloy and having a thickness of 5 µm to 50 µm is preferably used.

As the first adhesive layer 5, it is not specifically limited as long as it is an adhesive layer capable of setting the adhesive strength between the outer layer 2 and the aluminum foil layer 4 within a range of 2N/15 mm-width to 14N/15 mm-width. A urethane series adhesive layer, an acrylic series adhesive layer, etc., can be exemplified.

For example, when using a stretched nylon film as the heat resistant stretched resin film layer 2, by employing an urethane series adhesive layer as the first adhesive layer 5, the adhesive strength between the outer layer 2 and the aluminum foil layer 4 can be set within a range of 2N/15 mm-width to 14N/15 mm-width.

As the second adhesive layer 6, it is not specifically limited as long as it is an adhesive layer capable of setting the adhesive strength between the inner layer 3 and the aluminum foil layer 4 to 4N/15 mm-width to 30N/15 mm-width. For example, an adhesive layer formed by, e.g., a resin containing an acid-modified polyolefin such as a maleic anhydride-modified polyethylene and maleic anhydride-modified polypropylene, as well as urethane series resin, acrylic series resin, and thermoplastic elastomer, can be exemplified.

For example, as the thermoplastic unstretched resin film layer 3, in cases where an unstretched film layer made of at least one type of thermoplastic resin selected from the group consisting of polyethylene, polypropylene, olefin series copolymer, acid denaturation and ionomer thereof is used, by employing an acid-modified polyolefin adhesive layer, such as a maleic anhydride-modified polyethylene and maleic anhydride-modified polypropylene as the second adhesive layer 6, the adhesive strength between the inner layer 3 and the aluminum foil layer 4 can be set to a range of 4N/15 mm-width to 30N/15 mm-width.

Figure 2:
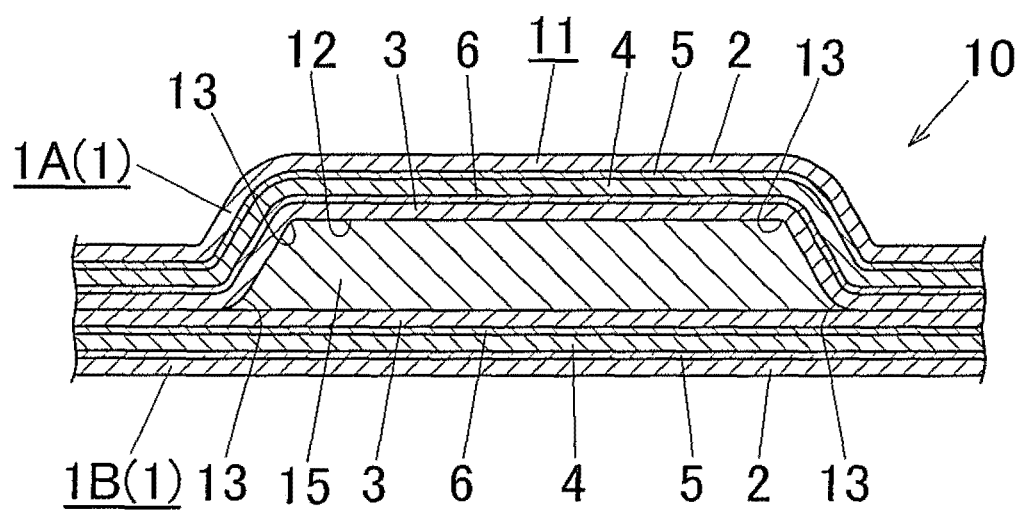
FIG. 2 is a cross-sectional view showing an embodiment of a battery according to the present invention.

An embodiment of a battery according to the present invention is shown in FIG. 2. The battery 10 of the present invention is equipped with two sheets of the outer packaging material 1 for a battery and a battery main body portion 15. The battery main body portion 15 includes a positive electrode, a negative electrode, and electrolyte.

One of the outer packaging materials 1A of the two battery outer packaging materials 1 is formed into a three-dimensional shape such as an approximately rectangular shape, etc., by forming (bulge processing, deep draw processing, etc.), and the other packaging material 1B is not subjected to forming, and thereby has a flat surface (See FIG. 2).

The battery main body portion 15 is arranged between the two battery outer packaging materials 1A and 1B, the peripheral edge portions of the inner layers 3 and 3 of the two battery outer packaging materials 1A and 1B are seal-bonded by heat sealing to thereby form a battery case 11. The battery main body portion 15 is encapsulated in the inner space 12 of the battery case 11 (See FIG. 2).

In the battery 10, when the internal pressure is increased to a range of 40 kPa to 80 kPa, a penetrated exhaust passage 21 is likely to be formed at a curved or bent shaped corner portion 13 of the inner layer 3 formed by the forming or vicinity thereof.

Therefore, in the battery 10, when the internal pressure of the battery case 11 is increased to a range of 40 kPa to 80 kPa due to the generation of gas inside the battery case 11, a penetrated exhaust passage 21 communicated with the inner space 12 of the battery case 11 is generated at the corner portion 13 of the inner layer 3 or vicinity thereof, and a separation gap 22 communicated with the penetrated exhaust passage 21 is generated between the aluminum foil layer 4 and the inner layer 3. As a result, the gas in the battery case 11 is released outside via the penetrated exhaust passage 21 and the separation gap 22, thereby preventing possible rupturing of the battery case 11 due to the increased internal pressure (See FIG. 3).

Figure 3:
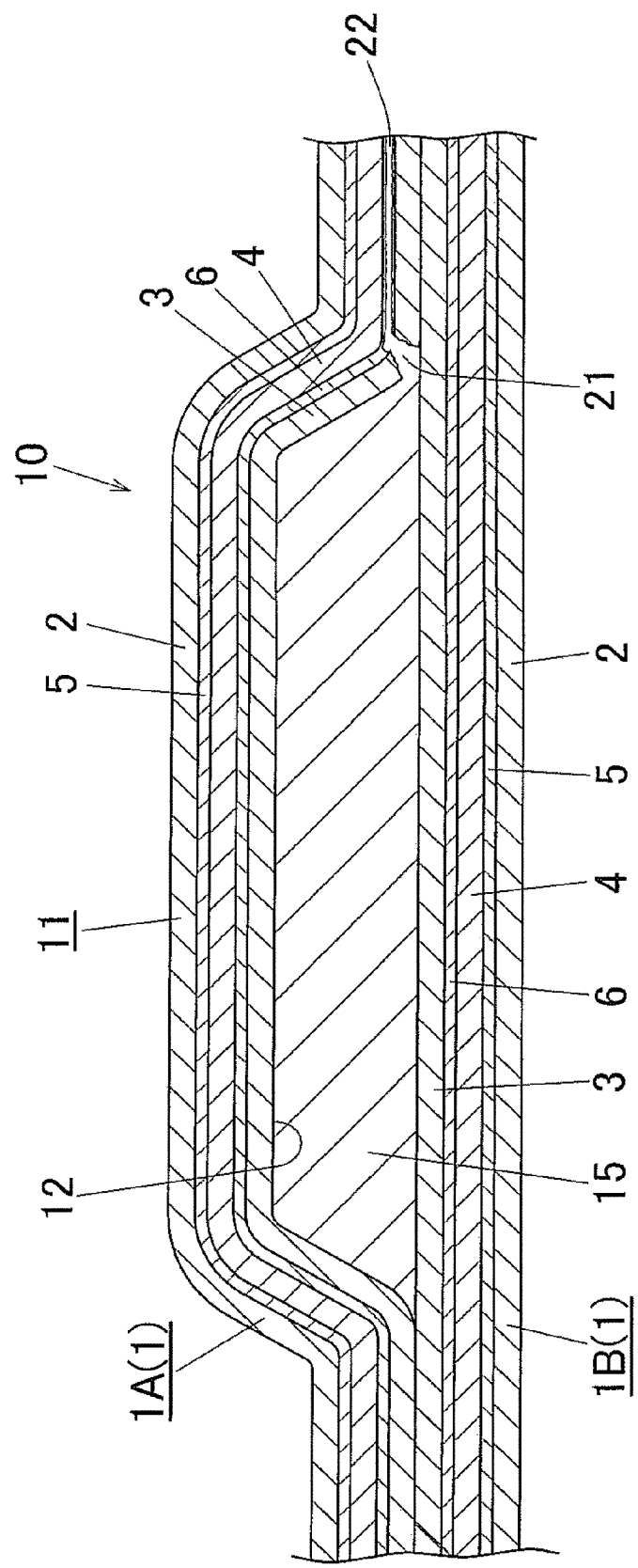
FIG. 3 is a schematic cross-sectional view of a battery showing a state in which a penetrated exhaust passage is formed in an inner layer and a separation gap is formed between an inner layer and an aluminum foil layer whereby a gas in a battery case is released outside to prevent rupturing due to an internal pressure increase.

FIG. 3 shows a state in which the penetrated exhaust passage 21 is generated at the bottom right corner portion 13 among the four corner portions 13 of the battery case 11, which does not always occur. For example, in some cases, the penetrated exhaust passage 21 may be generated at the bottom left corner portion 13, or the penetrated exhaust passage 21 may be generated at the top left corner portion 13.

Also, FIG. 3 shows a case in which the second adhesive layer 6 is left at both the aluminum foil layer 4 and the inner layer 3 when the separation gap 22 is formed, but not always limited thereto. For example, in some cases, a large portion of the second adhesive layer 6 remains on the aluminum foil layer 4 side, or a large portion of the second adhesive layer 6 remains on the inner layer 3 side.

EXAMPLES

Next, specific Examples of the present invention will be explained. It should be, however, noted that the present invention is not specifically limited to these Examples.

Example 1

A urethane series resin adhesive agent 5 was applied to one of surfaces of an aluminum foil (AA8079-O material) 4 having a thickness of 40 μm by a gravure roll, and dried to some extent by heating, and then a biaxially stretched nylon film 2 having a thickness of 25 μm was laminated on the adhesive agent surface. Thus, a laminated film was obtained.

Next, an acrylic series adhesive agent 6 was applied to the other of the surfaces of the aluminum foil of the obtained laminated film by a gravure roll, and dried to some extent by heating, and then an unstretched polypropylene film 3 having a thickness of 40 μm was laminated on the adhesive agent surface. Thus, a battery outer packaging material 1 as shown in FIG. 1 was obtained. Two of these battery outer packaging materials 1 were prepared.

In the obtained battery outer packaging material 1, the adhesive strength between the inner layer 3 and the aluminum foil layer 4 was 14.8N/15 mm-width and the adhesive strength between the outer layer 2 and the aluminum foil layer 4 was 7.8N/15 mm-width. The sealing strength of the two unstretched film layers as the inner layers 3 arranged one on the other and heat sealed was 59N/15 mm-width.

One of the outer packaging material 1A of the two battery outer packaging materials 1 was formed into a three-dimensional shape such as an approximately rectangular shape, etc., by deep draw processing. On the other hand, the other packaging material 1B was not subjected to forming and kept as a flat shape. Then, after arranging a battery main body 15 between the two battery outer packaging materials 1A and 1B, the peripheral edge portions of the inner layers 3 and 3 of the two battery outer packaging materials 1A and 1B were heat sealed to thereby form the battery case 11. Thus, a battery 10 in which the battery main body portion 15 was encapsulated in the inner space 12 of the battery case 11 was obtained (See FIG. 2).

Example 2

A battery outer packaging material 1 as shown in FIG. 1 was obtained in the same manner as in Example 1 except that an urethane series adhesive agent 6 was used in place of an acrylic series adhesive agent 6. In the obtained battery outer packaging material 1, the adhesive strength between the inner layer 3 and the aluminum foil layer 4 was 5.0N/15 mm-width, and the adhesive strength between the outer layer 2 and the aluminum foil layer 4 was 8.0N/15 mm-width. The sealing strength of the two unstretched film layers as the inner layers 3 arranged one on the other and heat sealed was 58.0N/15 mm-width. A battery 10 was obtained in the same manner as in Example 1 by using the battery outer packaging material 1.

Example 3

A battery outer packaging material 1 as shown in FIG. 1 was obtained in the same manner as in Example 1 except that an olefin series adhesive agent 6 was used in place of an acrylic series adhesive agent 6. In the obtained battery outer packaging material 1, the adhesive strength between the inner layer 3 and the aluminum foil layer 4 was 28.5N/15 mm-width, and the adhesive strength between the outer layer 2 and the aluminum foil layer 4 was 8.0N/15 mm-width. The sealing strength of two unstretched film layers as the inner layers 3 arranged one on the other and heat sealed was 58.0N/15 mm-width. A battery 10 was obtained in the same manner as in Example 1 by using the battery outer packaging material 1.

Example 4

A battery outer packaging material 1 as shown in FIG. 1 was obtained in the same manner as in Example 1 except that a polypropylene series adhesive agent 5 was used in place of an urethane series adhesive agent 5. In the obtained battery outer packaging material 1, the adhesive strength between the inner layer 3 and the aluminum foil layer 4 was 15.0N/15 mm-width, and the adhesive strength between the outer layer 2 and the aluminum foil layer 4 was 3.0N/15 mm-width. The sealing strength of two unstretched film layers as the inner layers 3 arranged one on the other and heat sealed was 58.0N/15 mm-width. A battery 10 was obtained in the same manner as in Example 1 by using the outer packaging material for a battery 1.

Example 5

A battery outer packaging material 1 as shown in FIG. 1 was obtained in the same manner as in Example 1 except that an olefin series adhesive agent 5 was used in place of a urethane series adhesive agent 5. In the obtained battery outer packaging material 1, the adhesive strength between the inner layer 3 and the aluminum foil layer 4 was 15.0N/15 mm-width, and the adhesive strength between the outer layer 2 and the aluminum foil layer 4 was 13.0N/15 mm-width. The sealing strength of two unstretched film layers as the inner layers 3 arranged one on the other and heat sealed was 58.0N/15 mm-width. A battery 10 was obtained in the same manner as in Example 1 by using the battery outer packaging material 1.

Example 6

A battery outer packaging material 1 as shown in FIG. 1 was obtained in the same manner as in Example 1 except that a biaxially stretched polyethylene film 3 was used in place of an unstretched polypropylene film 3. In the obtained battery outer packaging material 1, the adhesive strength between the inner layer 3 and the aluminum foil layer 4 was 15.0N/15 mm-width, and the adhesive strength between the outer layer 2 and the aluminum foil layer 4 was 8.0N/15 mm-width. The sealing strength of two unstretched film layers as the inner layers 3 arranged one on the other and heat sealed was 54.2N/15 mm-width. A battery 10 was obtained in the same manner as in Example 1 by using the battery outer packaging material 1.

Example 7

A battery outer packaging material 1 as shown in FIG. 1 was obtained in the same manner as in Example 1 except that a biaxially stretched polypropylene film 3 was used in place of an unstretched polypropylene film 3. In the obtained battery outer packaging material 1, the adhesive strength between the inner layer 3 and the aluminum foil layer 4 was 15.0N/15 mm-width, and the adhesive strength between the outer layer 2 and the aluminum foil layer 4 was 8.0N/15 mm-width. The sealing strength of two unstretched film layers as the inner layers 3 arranged one on the other and heat sealed was 99.5N/15 mm-width. A battery 10 was obtained in the same manner as in Example 1 by using the battery outer packaging material 1.

Comparative Example 1

A urethane series resin adhesive agent 5 was applied to a surface of an aluminum foil (AA8079-O material) 4 having a thickness of 40 μm by a gravure roll, and dried to some extent by heating. Thereafter, a biaxially stretched nylon film 2 having a thickness of 25 μm was laminated on the adhesive agent surface to thereby obtain a laminated film 40.

Figure 4:
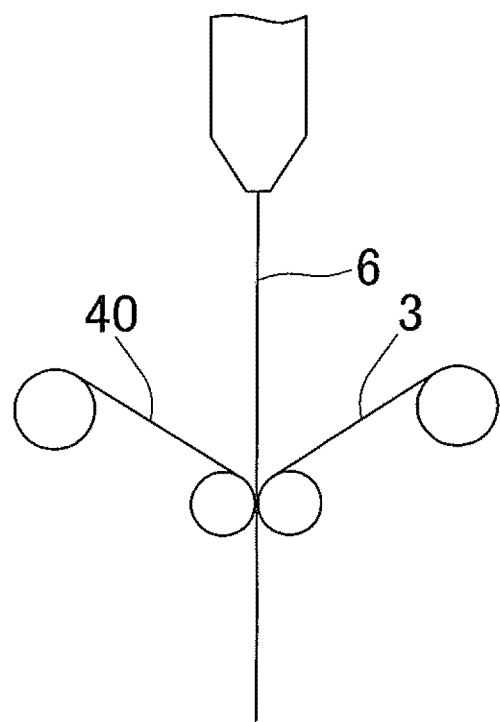
FIG. 4 is a drawing showing an example of a production method of an outer packaging material for a battery.

Next, as shown in FIG. 4, while extruding a maleic anhydride-modified polypropylene layer 6 having a thickness of 10 μm from an extruding device, the laminated film 40 was supplied from the left side in the figure so that the aluminum foil layer 4 side constitutes a laminating surface (the upper surface in FIG. 4), and an unstretched polypropylene film 3 having a thickness of 30 μm was supplied from the right side in the figure. The extruded maleic anhydride-modified polypropylene layer 6 was sandwiched between the unstretched polypropylene film 3 and the laminated film 40 by a pair of heat pressure rolls for heat laminating to thereby obtain a battery outer packaging material 1.

In the obtained battery outer packaging material 1, the adhesive strength between the inner layer 3 and the aluminum foil layer 4 was 14.8N/15 mm-width and the adhesive strength between the outer layer 2 and the aluminum foil layer 4 was 8N/15 mm-width. The sealing strength of the two unstretched film layers as the inner layers 3 arranged one on the other and heat sealed was 25.0N/15 mm-width. A battery 10 was obtained in the same manner as in Example 1 using the battery outer packaging material 1.

Comparative Example 2

A battery outer packaging material 1 was obtained in the same manner as in Comparative Example 1 except that an unmodified polypropylene layer 6 was used in place of maleic anhydride-modified polypropylene layer 6 and an unstretched polyethylene-propylene copolymer film 3 was used in place of an unstretched polypropylene film 3. In the obtained battery outer packaging material 1, the adhesive strength between the inner layer 3 and the aluminum foil layer 4 was 3.0N/15 mm-width, and the adhesive strength between the outer layer 2 and the aluminum foil layer 4 was 8.1N/15 mm-width. The sealing strength of the two unstretched film layers as the inner layers 3 arranged one on the other heat sealed was 60.2N/15 mm-width. A battery 10 was obtained in the same manner as in Example 1 by using the outer packaging material for a battery 1.

Comparative Example 3

A battery outer packaging material 1 was obtained in the same manner as in Comparative Example 1 except that a modified polyolefin layer 6 was used in place of maleic anhydride-modified polypropylene layer 6 and an unstretched polyethylene film 3 was used in place of an unstretched polypropylene film 3. In the obtained battery outer packaging material 1, the adhesive strength between the inner layer 3 and the aluminum foil layer 4 is 31.4N/15 mm-width, and the adhesive strength between the outer layer 2 and the aluminum foil layer 4 is 7.9N/15 mm-width. The sealing strength of the two unstretched film layers as the inner layers 3 arranged one on the other and heat sealed was 30.3N/15 mm-width. A battery 10 was obtained in the same manner as in Example 1 by using the battery outer packaging material 1.

Comparative Example 4

A battery outer packaging material 1 was obtained in the same manner as in Comparative Example 1 except that a polyester series adhesive agent 5 was used in place of an urethane series adhesive agent 5 and an unstretched polyethylene film 3 was used in place of an unstretched polypropylene film 3. In the obtained battery outer packaging material 1, the adhesive strength between the inner layer 3 and the aluminum foil layer 4 was 14.8N/15 mm-width, and the adhesive strength between the outer layer 2 and the aluminum foil layer 4 was 1.1N/15 mm-width. The sealing strength of the two unstretched film layers as the inner layers 3 arranged one on the other and heat sealed was 31.0N/15 mm-width. A battery 10 was obtained in the same manner as in Example 1 by using the battery outer packaging material 1.

Example 8

A battery outer packaging material 1 was obtained in the same manner as in Comparative Example 1 except that an unstretched polyethylene-propylene copolymer film 3 was used in place of an unstretched polypropylene film 3. In the obtained battery outer packaging material 1, the adhesive strength between the inner layer 3 and the aluminum foil layer 4 was 14.7N/15 mm-width, and the adhesive strength between the outer layer 2 and the aluminum foil layer 4 was 8.0N/15 mm-width. The sealing strength of the two unstretched film layers as the inner layers 3 arranged one on the other and heat sealed was 35.0N/15 mm-width. A battery 10 was obtained in the same manner as in Example 1 by using the battery outer packaging material 1.

In the aforementioned Examples and Comparative Examples, the "adhesive strength" and the "sealing strength" were measured in the following manner.

<Adhesive Strength Measurement Method>

A test piece 15 mm in width and 150 mm in length was cut out from the obtained battery outer packaging material 1. The end portion of the test piece in the lengthwise direction thereof was immersed in an alkaline stripping agent to thereby separate the inner layer 3 and the aluminum foil layer 4, as well as the outer layer 2 and the aluminum foil layer 4. Next, the inner layer 3 of the test piece in a state in which the end portion thereof was separated was chucked with a chuck portion of a strograph manufactured by Toyo Seiki Kogyo Co., Ltd., to measure the peel strength when the layer was peeled at 90 degrees at a tension speed of 100 mm/min, which was used as the adhesive strength (laminating strength) (N/15 mm-width) of the inner layer and the aluminum foil layer. Thereafter, the outer layer 2 of the test piece was chucked with a chuck portion of a strograph manufactured by Toyo Seiki Kogyo Co., Ltd., to measure the peel strength when the layer was peeled at 90 degrees at a tension speed of 100 mm/min. The measurement was deemed as the adhesive strength (laminating strength) (N/15 mm-width) of the outer layer and the aluminum foil layer.

<Sealing Strength Measurement Method>

A test piece 15 mm in width was cut out from a sealed portion where the inner layers 3 and 3 of the battery outer packaging materials 1A and 1B of the obtained battery were heat sealed, and the peel strength thereof was measured when the test piece was peeled at 90 degrees at a tension speed of 100 mm/min using a strograph manufactured by Toyo Seiki Kogyosyo, Co., Ltd. The measurement was deemed as the sealing strength (N/15 mm-width).

As it is apparent from Table 1, in the battery of Examples 1 to 8 constituted by using the battery outer packaging material of the present invention, when the internal pressure of the battery case increased excessively, the gas inside the battery case was released, preventing rupturing of the battery case due to an excessive increase in the internal pressure, and there was no outflow of the content fluid.

Figure 5:
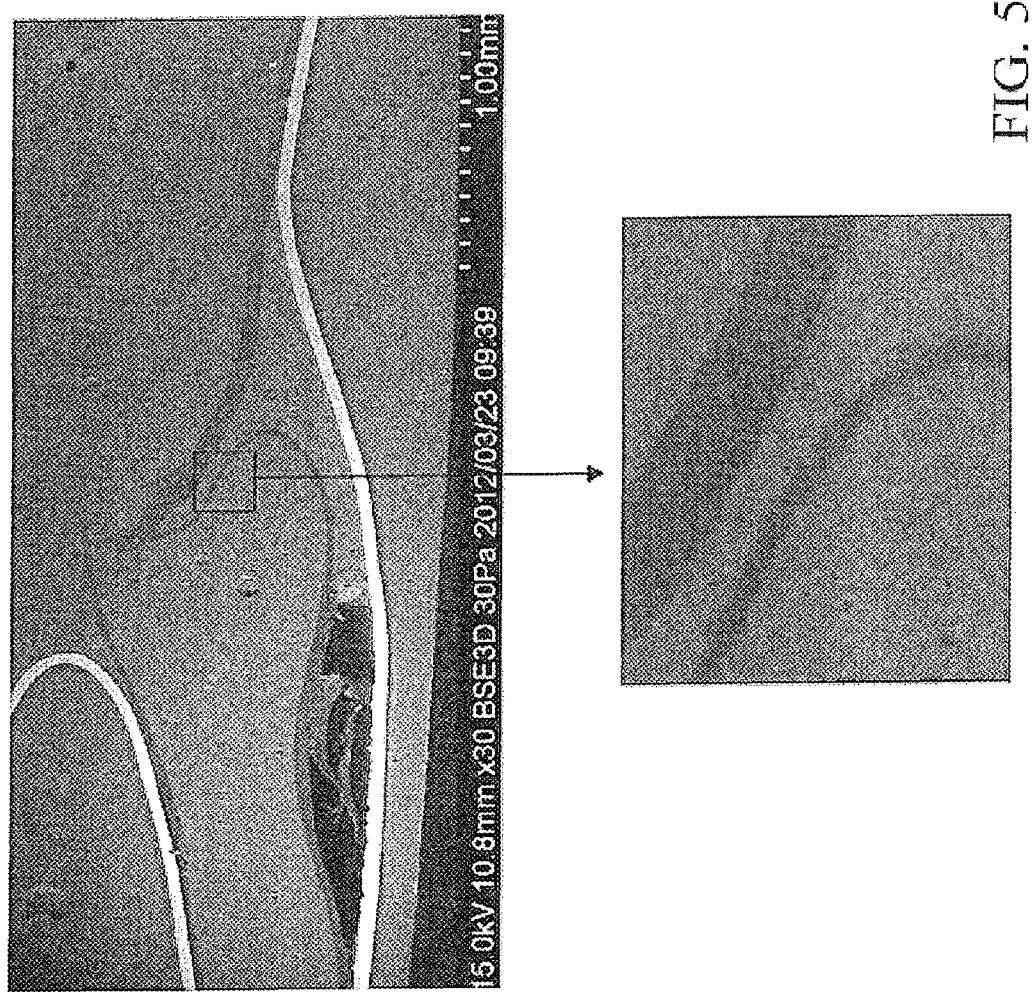
FIG. 5 is an electron micrograph (SEM photograph) showing a cross-section of a portion of the battery case where a penetrated exhaust passage was formed and a region including a separation gap caused by an excessively increased internal pressure of the battery case in a battery according to Embodiment 1 in which a gas was released.
Figure 6:
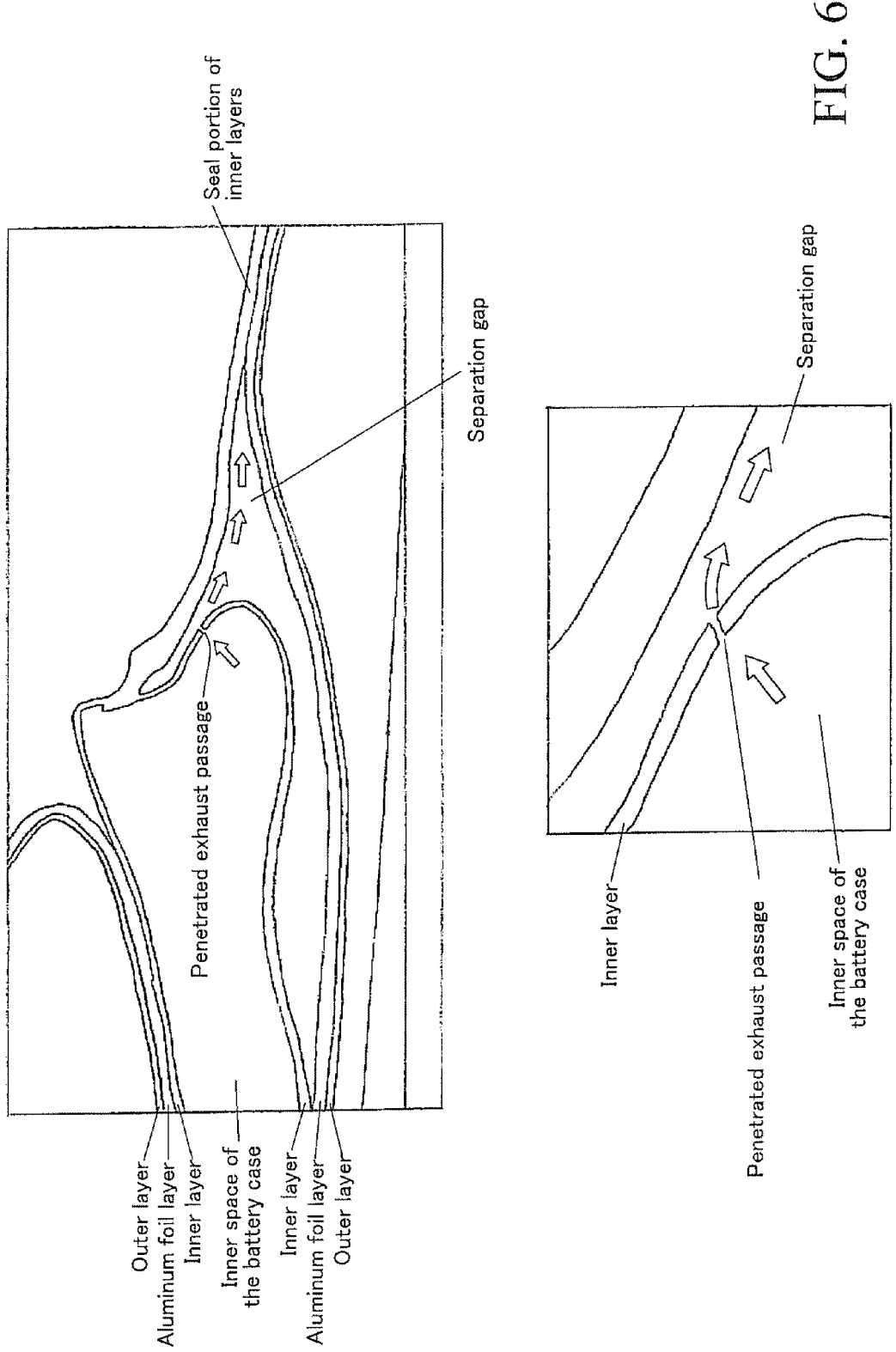
FIG. 6 is an explanatory schematic drawing of the electron micrograph of FIG. 5 describing each portion shown in the electron micrograph. The thick white arrows in FIG. 6 show passages through which the gases inside the battery were released.

FIG. 5 is an electron micrograph showing a state in which the internal pressure of the battery case of the battery in Example 1 increased excessively and degassing was performed. As shown in FIGS. 5 and 6, it is recognized that a separation gap is formed between the inner layer (the darkest portion) and the aluminum foil layer (white portion), and a penetrated exhaust passage communicated with the separation gap and penetrated through the inner layer in the thickness direction thereof is formed (See FIG. 6). The thick white arrow in FIG. 6 shows the passage through which the gas inside the battery was released.

On the other hand, in the battery of Comparative Example 1, when the internal pressure reached 20 kP, the inner layers were separated and the content fluid was flowed out. In Comparative Example 2, since the inner layers were separated during forming, the evaluation for rupture prevention characteristics was not performed. In Comparative Example 3, the

TABLE 1

| | Adhesive Strength between the outer layer and the aluminum foil layer (N/15 mm-width) | Adhesive Strength between the inner layer and the aluminum foil layer (N/15 mm-width) | Sealing Strength between the inner layers (N/15 mm-width) | [Evaluation of Rupture Prevention] Behavior of the battery outer packaging material when the internal pressure in the battery case is gradually increased |
|---|---|---|---|---|
| Ex. 1 | 8.0 | 15.0 | 58.0 | Gas was released when the internal pressure reached 60 kPa, no outflow of content fluid |
| Ex. 2 | 8.0 | 5.0 | 58.0 | Gas was released when the internal pressure reached 45 kPa, no outflow of content fluid |
| Ex. 3 | 8.0 | 28.5 | 58.0 | Gas was released when the internal pressure reached 75 kPa, no outflow of content fluid |
| Ex. 4 | 3.0 | 15.0 | 58.0 | Gas was released when the internal pressure reached 60 kPa, no outflow of content fluid |
| Ex. 5 | 13.0 | 15.0 | 58.0 | Gas was released when the internal pressure reached 60 kPa, no outflow of content fluid |
| Ex. 6 | 8.0 | 15.0 | 54.2 | Gas was released when the internal pressure reached 61 kPa, no outflow of content fluid |
| Ex. 7 | 8.0 | 15.0 | 99.5 | Gas was released when the internal pressure reached 57 kPa, no outflow of content fluid |
| Ex. 8 | 8.0 | 14.7 | 35.0 | Gas was released when the internal pressure reached 60 kPa, no outflow of content fluid |
| Comp. Ex. 1 | 7.8 | 14.8 | 25.0 | Inner layers separated when the internal pressure reached 20 kPa, content fluid spilled |
| Comp. Ex. 2 | 8.1 | 3.0 | 60.2 | (inner layers were separated during forming) |
| Comp. Ex. 3 | 7.9 | 31.4 | 30.3 | Content fluid (electrolyte) flowed out when the internal pressure reached 30 kPa. |
| Comp. Ex. 4 | 1.1 | 14.8 | 31.0 | (outer layers separated during forming) |

The rupture prevention characteristics of the battery cases 11 of each battery 10 of Examples 1 to 8 and Comparative Examples 1 to 4 obtained as described above were evaluated in the following manner. The results are shown in Table 1.

<Evaluation Method of Rupture Prevention Characteristics>

By accelerating the decomposition of electrolyte by overcharging, the internal pressure of the battery case 11 of each battery was gradually increased until any change of event such as degassing or a spilling of content fluid occurred (until the maximum internal pressure of 100 kPa). The internal pressure (kPa) when the gas inside the battery case started releasing to the outside was measured. Also, the existence of outflow of content fluid was examined when degassing occurred.

electrolyte content flowed out when the internal pressure reached 30 kPa. In Comparative Example 4, the evaluation for rupture prevention characteristics was not performed because the outer layers were separated during forming.

The present invention claims priority to Japanese Patent Application No. 2012-241723 filed on Nov. 1, 2012 and Japanese Patent Application No. 2012-255046 filed on Nov. 21, 2012, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The outer packaging material for a battery according to the present invention can be used as an outer packaging material for a battery for, e.g., a secondary battery (lithium-ion secondary battery, etc.). Among other things, rupturing of a packaging material due to an internal pressure increase can be prevented since degassing can be performed when the internal pressure increases, and therefore it can be suitably used as a packaging material for a battery for use in mobile devices and a packaging material for a battery for use in automobiles.

DESCRIPTION OF THE REFERENCE NUMERALS

1: outer packaging material for a battery
2: outer layer (heat resistant stretched resin layer)
3: inner layer (thermoplastic unstretched resin layer)
4: aluminum foil layer
5: first adhesive layer
6: second adhesive layer
10: battery
11: battery case
12: inner space
13: corner portion
15: battery main body portion
21: penetrated exhaust passage
22: separation gap

The invention claimed is:

1. An outer packaging material for a battery, comprising:
an aluminum foil layer;
a stretched nylon film layer as an outer layer integrally laminated on one surface of the aluminum foil layer via a first adhesive layer; and
a thermoplastic unstretched resin film layer as an inner layer integrally laminated on the other surface of the aluminum foil layer via a second adhesive layer,
wherein an adhesive strength between the inner layer and the aluminum foil layer is 4N/15 mm-width to 30N/15 mm-width,
wherein an adhesive strength between the outer layer and the aluminum foil layer is 2N/15 mm-width to 14N/15 mm-width, and
wherein a sealing strength of the inner layer heat sealed to the inner layer exceeds 30N/15 mm-width but does not exceed 110N/15 mm-width.

2. The outer packaging material for a battery as recited in claim 1, wherein the second adhesive layer is a layer formed by a dry lamination method using an adhesive agent.

3. A battery comprising:
the outer packaging material as recited in claim 1; and
a battery main body portion,
wherein a peripheral edge portion of the inner layer of the outer packaging material is seal-bonded by heat sealing to form a battery case, and
wherein the battery main body portion is encapsulated in the battery case.

4. The battery as recited in claim 3, wherein, when an internal pressure of the battery case is increased to a range of 40 kPa to 80 kPa due to a gas generated in the battery case, a penetrated exhaust passage communicated with an inner space of the battery case is formed in the inner layer, and a separation gap communicated with the penetrated exhaust passage is formed between the aluminum foil layer and the inner layer, so that a gas in the battery case is released to the outside via the penetrated exhaust passage and the separation gap to prevent rupturing of the battery case due to an internal pressure increase.

5. The battery as recited in claim 3, wherein the outer packaging materials is formed into a three-dimensional shape by deep draw processing or bulge processing.

6. The battery as recited in claim 5, wherein the penetrated exhaust passage is formed at a curved or bent shaped corner portion of the inner layer formed by the processing or vicinity thereof.

* * * * *